(12) United States Patent
Burns et al.

(10) Patent No.: US 8,635,896 B2
(45) Date of Patent: Jan. 28, 2014

(54) ASSEMBLY FOR ASSISTING THE REMOVAL FROM STORAGE AND TRANSFER OF WIRE

(75) Inventors: Thomas W. Burns, Traverse City, MI (US); Todd W. Peters, Traverse City, MI (US)

(73) Assignee: Alcotec Wire Corporation, Traverse City, MI (US)

( * ) Notice: Subject to any disclaimer, the term of this patent is extended or adjusted under 35 U.S.C. 154(b) by 420 days.

(21) Appl. No.: 12/931,007

(22) Filed: Jan. 21, 2011

(65) Prior Publication Data

US 2012/0186689 A1 Jul. 26, 2012

(51) Int. Cl.
*B21D 3/02* (2006.01)
*B21F 1/02* (2006.01)

(52) U.S. Cl.
USPC ............................................. 72/164; 140/147

(58) Field of Classification Search
USPC ..................... 72/160, 162, 164, 365.2, 366.2; 140/147
See application file for complete search history.

(56) References Cited

U.S. PATENT DOCUMENTS

| | | | | |
|---|---|---|---|---|
| 3,595,277 A | * | 7/1971 | Lefever | 140/147 |
| 4,464,919 A | * | 8/1984 | Labbe | 72/162 |
| 4,949,567 A | * | 8/1990 | Corbin | 72/164 |
| 6,006,573 A | * | 12/1999 | Van Merksteijn | 72/160 |

* cited by examiner

*Primary Examiner* — Debra Sullivan
(74) *Attorney, Agent, or Firm* — Kacvinsky Daisak PLLC

(57) ABSTRACT

An assembly for moving wire from one point to a second point distant from the first point. The assembly comprises a first unit comprising a wire straightner and a second unit that moves the wire through the assembly.

2 Claims, 1 Drawing Sheet

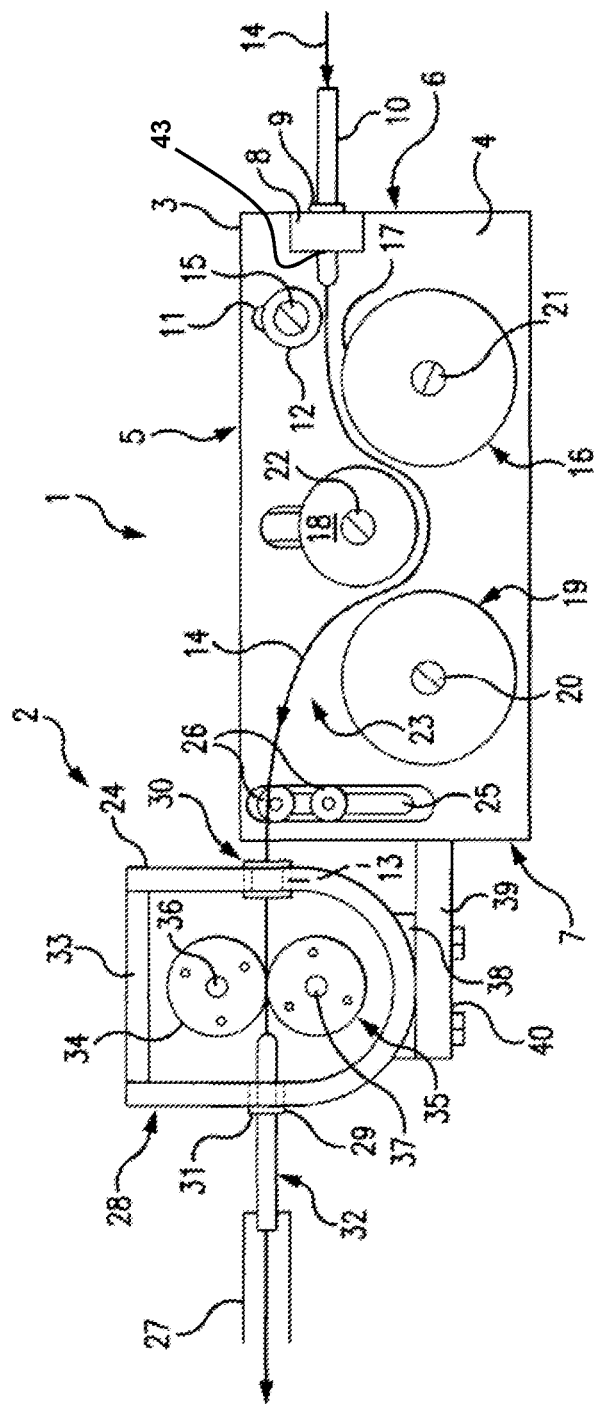
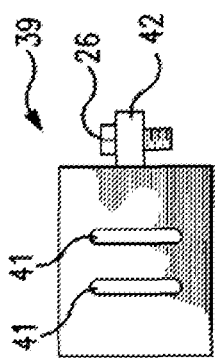
FIG. 1
FIG. 2

ASSEMBLY FOR ASSISTING THE REMOVAL FROM STORAGE AND TRANSFER OF WIRE

BACKGROUND OF THE INVENTION

This invention deals with an apparatus that is useful to solve a major problem in handling coiled wire. Coiled wire is commercially packed, shipped and stored in a coiled configuration, most of the time using a storage container.

As a consequence, it takes on a certain cast to the metal such that when the wire is uncoiled for use, it forms a sine wave in configuration and if the wire is not handled correctly, this sine wave configuration (the cast of the wire) can become helical in nature and can lead to snarled, crimped, or bent wire.

In use for welding, where the wire is fed to a welding gun, the wire enters the gun through the rear of the gun and is subjected to electrical energy wherein it melts and is placed into channels in the metal to be welded to form a weld bead.

In cases where only short segments of the wire are needed, the cast of the wire does not ordinarily make a difference, but where long weld beads are required, the wire has to be controlled before entering the welding gun.

If not controlled, the wire, upon leaving the tip of the welding gun, and before it is melted, typically bends in any given direction and does not lay into the channel to form the bead. Thus, one is forced to use short segments of wire (which do not retain the cast of the coiled wire), or the wire is short enough that it can be hand bent to get rid of the wire cast and provide a straight piece of wire.

Even in longer segments, the wire, if not controlled, tends to re-coil, that is, attempts to resume its original cast, or bends out of linearity and causes disruptions in the equipment, which causes a disruption of the welding process and a possible shutdown of the equipment for repair. It also provides snarled and bent wire which is useless for re-use and is costly to replace.

The assembly provided by this invention assists the removal of the wire from stored packaging and helps deliver the wire to a wire feed by modifying the cast from the sine wave of the stored wire before it forms into a helical coil and presents problems. This device is especially useful for transferring long segments of wire, sometimes as long as up to one hundred feet long.

The device provides a simple system to provide straight wire to a welding gun and in addition allows the positioning of the plastic conduit in which it is carried throughout the manufacturing facility, in and around the equipment found in the conventional manufacturing situation so that the wire does not provide an unsafe condition in the manufacturing facility. The patentee is not aware of any such assembly in use today.

THE INVENTION

Thus, what is disclosed and claimed herein is an assembly for moving wire from one point to a second point distant from the first point. The assembly comprises a first unit comprising a wire straightner wherein the wire straightener is comprised of a mounting plate, the plate having a front flat surface, a back flat surface, a rearward edge, and a forward edge.

There is a mounting means mounted on the front flat surface and near the rear edge, the mounting means having a centered opening through it. The opening contains fixed therein, a hollow inlet guide tube. The tube extends through the opening such that it extends rearwardly and forwardly of the mounting means.

There is a wire guide sheave mounted to the front flat surface such that the bottom edge of the wire guide sheave contacts a wire being processed through the unit.

There is a first roll straightner sheave mounted on the front flat surface and beneath the wire guide sheave. The first roll straightner has a centered axle.

There is a vertically adjustable center sheave roller mounted on the front flat surface and forward of the first roll straightner sheave and a second roll straightner sheave mounted on the front flat surface and forward of the adjustable center sheave. The sheave has a centered axle. The first roll straightner sheave axle and the second roll straightner sheave axle are linearly aligned. There is a slotted vertical opening near the front edge of the mounting plate.

There is a second unit comprising a wire drive, puller and driver, said wire drive puller and driver having a housing mounted on a back plate.

The housing has a front wall and a rear wall and there is an opening centered in the front wall and the rear wall, each opening having a guide bushing therein. The front bushing has mounted therein an outlet guide tube wherein the outlet guide tube extends rearwardly and forwardly of the guide bushing.

Contained in the second unit housing is an idler drive roll and a driven drive roll, the idler roll and the drive roll both have centered axles. The idler roll and drive roll contact each other on a portion of the outer circumferential surfaces.

The second unit housing is mounted on a base, which surmounts a mounting block having a bottom surface, wherein the mounting block has two slotted openings through it. There is a pair of bolts threaded into the bottom surface of the base.

The mounting block is extended to and behind the back surface of the first unit mounting plate. The mounting block has an extension detachedly attached to the back surface of the first unit mounting plate by fasteners through the slotted vertical opening near the front edge of the first unit mounting plate.

In a second embodiment, there is a method of moving wire from one point to a second point that is distant from the first point using the assembly as described Supra.

The method comprises employing an assembly as discussed Supra and as a first step, providing a storage unit containing coiled wire.

One then moves a lead end of the stored wire into the inlet guide tube of the first unit and thereafter moves the wire under the wire guide sheave, over a circumferential surface of the first roll straightner sheave, under a circumferential surface of the adjustable center sheave roller, over a circumferential surface of the second roll straightner sheave to modify the cast of the wire, and then, into the guide bushing of the rear wall of the second unit, between circumferential surfaces of the idler drive roll and the driven drive roll, into the outlet guide tube, into a plastic conduit, said plastic conduit being of a length to carry the wire internally to a welding gun being used some distance from the wire storage unit.

The second unit is then allowed to provide the wire through the conduit to the welding gun at a predetermined rate provided by the second unit.

"Sheave" as used herein is a wheel or roller with a groove in its circumferential surface for guiding a belt, rope, wire or cable.

BRIEF DESCRIPTION OF THE DRAWINGS

FIG. 1 is a full side view of an assembly of this invention wherein for purposes of description in this specification, the forward end is on the left.

FIG. 2 is a full top view of the mounting block of the second unit of the assembly.

DETAILED DESCRIPTION OF THE INVENTION

The assembly is comprised of two units working in combination, namely, a first unit 1 which is a straightner and a second unit 2 which is a wire drive puller and driver.

The wire straightner 1 is comprised of a mounting plate 3 which is used to mount the components of the first unit in a predetermined manner, namely, such that the components are linearly aligned from right to left (the direction of the flow of the wire being processed through the unit). The mounting plate 3 is also used to stabilize the various components of the first unit 1.

The mounting plate 3 has a front flat surface 4, a back flat surface 5 (not visible in this Figure), a rearward edge 6 (to the right) and a forward edge 7 (to the left).

There is a mounting means 8 for mounting a wire guide 9. The mounting means 8 is mounted on the front flat surface 4 and near the rear edge 6. The mounting means 8 has an opening 43 through it, the opening 43 containing a hollow inlet guide tube 10. The tube 10 extends forwardly and rearwardly such that it extends beyond the mounting means 8.

There is a wire guide sheave 11 mounted to the front flat surface 4 such that the bottom edge 12 of the wire guide sheave 11 contacts a wire 14 that is being processed through the unit. The wire guide sheave 11 has a centered axle 15 such that allows it to rotate in the direction opposite of the forward path of the wire 14.

There is a first roll straightner sheave 16 mounted on the front flat surface 4 and beneath the wire guide sheave 11 such that the wire guide sheave 11 maintains the wire 14 essentially level with the top of the circumferential surface 17 of the first roll straightner sheave 16. By this, it is meant that the wire 14 at this point is maintained such that it does not have a significant hooped portion. The first roll straightner sheave 16 also has a centered axle 21 that allows it to rotate in the direction of the forward path of the wire 14.

There is a vertically adjustable center sheave roller 18 mounted on the front flat surface 4 and forward of the first roll straightner sheave 16. This sheave 18 has a centered axle 22 that will allow rotation of the sheave 18 opposite of the travel of the wire 14. The sheave 18 is adjustable in a vertical manner, such that the wire 14 maintains contact with the first roll straightner sheave 16 and with the second roll straightner sheave 19. This action of the sheaves 16, 18, and 19 applies pressure in the shown configuration, to the wire 14, and modifies the cast of the wire 14 such that it is essentially straightened.

The second roll straightner sheave 19 is mounted on the front flat surface 4 and forward of the adjustable center sheave 16. The sheave 19 has a centered axle 20 that allows it to rotate in the direction of the forward path of the wire 14. At this point, as the wire 14 leaves the second roll straightner sheave 19, it forms a slight hooped configuration 23, but owing to the fact that the wire 14 has been straightened, there are no significant problems associated with the formation of such a hooped configuration 23 at this point. Furthermore, the hooped configuration allows for flexibility to adjust the level of the wire 14 in the first unit 1 to be essentially level with the opening 13 in the back 24 of the wire drive, puller and driver 2.

It should be noted that the axles 20 and 21 are linearly aligned so that the path of the wire 14 is aligned on the sheaves 16, 18, and 19.

The sheaves 16, 18 and 19 are generally made from some durable, but soft plastic or the like, that has ceramic, or the like embedded therein. The only critical aspect of the sheaves is that they do not severely abrade the metal wire 14 as it is being pulled across the sheaves; therefore, it is generally prudent to provide such sheaves as plastics with particles embedded therein to provide some modicum of friction for pulling purposes. Ultra High Molecular Weight polyethylene embedded with ceramic particles has been found useful, as has phenolic and urethane resins. Metal sheaves can be used herein, but there is a significant abrasion of the metal wire 14.

There is a slotted vertical opening 25 near the forward edge 7 of the mounting plate 3. This slotted vertical opening 25 is used in conjunction with the bolts 26 to adjust the second unit 2 for alignment with first unit 1.

The second unit 2 is a wire drive puller and driver, that is, this second unit 2 both pulls the wire 14 from first unit 1 and drives the wire 14 into the conduit 27 for transport.

The second unit 2 is comprised of a housing 33 that has a front wall 28 and a back wall 24. There is an opening 29 in the front wall 28 and an opening 13 in the back wall 24. Each opening 13 and 29 has a guide bushing in it, namely, 30 in the back wall 24 and 31 in the front wall 28. The bushing 31 has a outlet guide tube 32 through which the wire 14 passes and is guided thereby. It should be noted that the outlet guide tube 32 extends beyond the bushing 31, rearwardly and forwardly. The outlet guide tube 32 has attached to it, a plastic conduit 27, which is the conduit that the wire 14 is transported through to its end use in the welding gun. The conduit for purposes of this invention can be any flexible conduit, but it is preferred to use plastic, or elastomer materials that will provide protection against abrasion of the metal as it slides through the conduit.

Contained in the second unit housing 33, is an idler drive roll 34 and a driven drive roll 35, the idler roll 34 and the drive roll 35 each having centered axles, 36 and 37 respectively, that allow the respective rolls to rotate, the idler roll 34 in a direction opposite to the forward movement of the wire 14, and the drive roll 35 in a direction consistent with the movement of the wire 14.

It should be noted that the idler roll 34 and the drive roller 35 intimately contact each other in order to provide pressure on the wire 14 to create enough friction to move the wire 14 forward. The contact, obviously, is between the rollers circumferential surfaces.

The second unit 2 is mounted on a base 38, which surmounts a motor mounting block 39, having a bottom surface 40, wherein the mounting block 39 has two slotted, parallel openings 41.

With reference to FIG. 2, there is shown a top view of the mounting bock 39 showing two slotted openings 41. In addition, the mounting block extension 42 is shown with a bolt 26, the extension mounting behind the mounting plate 3 and the bolts 26 fastening through the slotted opening 25 in the forward edge 7 of the mounting plate 3.

Turning now to the other embodiment of this invention which is a method of moving wire from one point to a second point distant from the first point, the method comprises employing an assembly as discussed just Supra.

For the method, there is provided a storage unit containing coiled wire which can be purchased commercially. One then moves a lead end of the stored wire into the inlet guide tube of the first unit.

Thereafter, the wire is pulled under the wire guide sheave, over a circumferential surface of the first roll straightner sheave, under a circumferential surface of the adjustable center sheave roller, over a circumferential surface of the second roll straightner sheave to modify the cast of the wire, and then, into the guide bushing of the rear wall of the second unit, between circumferential surfaces of the idler drive roll and the driven drive roll, into the outlet guide tube, into a plastic conduit, said plastic conduit being of a length to carry the wire internally to a welding gun being used some distance from the wire storage unit.

Thereafter, allowing the second unit to provide the wire to the welding gun at a predetermined rate provided by the second unit.

Although electrical motors can be used, it is preferred for second unit 2 to be an air driven system to power the drive motor attached to the drive roll 35. Using air eliminates the need for electrical interface/power to drive the unit and removes issues and regulations using power supply. It also allows usage in those areas of the World that do not have sufficient electrical energy sources to power such equipment. The air driven system also allows a positive load to be applied to the drive rolls while being stalled, without current or heat buildup. Stalling air motors (as opposed to electrical motors) has little to no effect on wear issues and can be regulated to offer the appropriate load.

It is to be noted that the wire 14 is forced through a series of three specific plastic (ultra high molecular weight polyethylene) reinforced with ceramic fiber wheels that mechanically yield the wire 14 to force it to take the shape or cast of the wheel in the series of three.

What we claim is:

1. An assembly for moving wire from one point to a second point distant from the first point, said assembly comprising:
   - a first unit comprising a wire straightner, said wire straightner having:
   - a mounting plate, said plate having a front flat surface, a back flat surface, a rearward edge, and a forward edge;
   - a mounting means mounted on the front flat surface and near the rear edge, said mounting means having a centered opening therethrough, said opening containing fixed therein, a hollow inlet guide tube, said tube extending through the opening such that it extends rearwardly and forwardly of the mounting means;
   - a wire guide sheave mounted to the front flat surface such that the bottom edge of the wire guide sheave contacts a wire being processed through the unit;
   - a first roll straightner sheave mounted on the front flat surface and beneath the wire guide sheave, said first roll straightner having a centered axle;
   - a vertically adjustable center sheave roller mounted on the front flat surface and forward of the first roll straightner sheave;
   - a second roll straightner sheave mounted on the front flat surface and forward of the adjustable center sheave, said sheave having a centered axle;
   - said first roll straightner sheave axle and said second roll straightner sheave axle being linearly aligned;
   - a slotted vertical opening near the front edge of the mounting plate;
   - a second unit comprising a wire drive, puller and driver, said wire drive puller and driver having a housing mounted on a back plate;
   - said housing having a front wall and a rear wall and there being an opening centered in the front wall and the rear wall, each opening having a guide bushing therein, said front bushing having mounted therein an outlet guide tube, said outlet guide tube extending rearwardly and forwardly of the guide bushing;
   - contained in the second unit housing, an idler drive roll and a driven drive roll, the idler roll and the drive roll having centered axles, said idler roll and drive roll contacting each other on a portion of the outer circumferential surfaces;
   - said second unit housing mounted on a base, which surmounts a mounting block having a bottom surface, wherein the mounting block has two slotted openings therethrough, a pair of bolts threaded into the bottom surface of the base;
   - said mounting block being extended to and behind the back surface of the first unit mounting plate, said mounting block extension being detachedly attached to the back surface of the first unit mounting plate by fasteners through the slotted vertical opening near the front edge of the first unit mounting plate.

2. A method of moving wire from one point to a second point distant from the first point, said method comprising:
   I. employing an assembly as claimed in claim 1;
   II. providing a storage unit containing coiled wire;
   III. moving a lead end of the stored wire into the inlet guide tube of the first unit;
   IV. moving the wire under the wire guide sheave, over a circumferential surface of the first roll straightner sheave, under a circumferential surface of the adjustable center sheave roller, over a circumferential surface of the second roll straightner sheave to modify the cast of the wire, and then, into the guide bushing of the rear wall of the second unit, between circumferential surfaces of the idler drive roll and the driven drive roll, into the outlet guide tube, into a plastic conduit, said plastic conduit being of a length to carry the wire internally to a welding gun being used some distance from the wire storage unit;
   V. allowing the second unit to provide the wire to the welding gun at a predetermined rate provided by the second unit.

\* \* \* \* \*